United States Patent [19]

Reitmeier et al.

[11] Patent Number: 4,605,963
[45] Date of Patent: Aug. 12, 1986

[54] REDUCTION OF CONTROL BITS FOR ADAPTIVE SUB-NYQUIST ENCODER

[75] Inventors: Glenn A. Reitmeier, Trenton; Curtis R. Carlson, Princeton, both of N.J.

[73] Assignee: RCA Corporation, Princeton, N.J.

[21] Appl. No.: 523,823

[22] Filed: Aug. 15, 1983

[51] Int. Cl.[4] .......................... H04N 7/04; H04N 7/12
[52] U.S. Cl. ...................................... 358/141; 358/13; 358/133; 358/135; 358/138
[58] Field of Search ................ 358/13, 133, 135, 138, 358/141, 146, 147, 260, 263; 375/31, 33

[56] References Cited

U.S. PATENT DOCUMENTS

| 4,141,034 | 2/1979 | Netravali et al. | 358/135 |
| 4,323,916 | 4/1982 | Dischert et al. | 358/13 |
| 4,531,151 | 7/1985 | Hentschke | 358/135 |

FOREIGN PATENT DOCUMENTS 2120504  11/1983  United Kingdom .

Primary Examiner—Tommy P. Chin
Assistant Examiner—Michael D. Parker
Attorney, Agent, or Firm—P. J. Rasmussen; P. M. Emanuel; R. G. Coalter

[57] ABSTRACT

A digital TV system reduces the data rate by transmitting or recording only bytes representing half of the sampled pixels. Steering bits are also transmitted that tell which of the transmitted bytes are the closest match to the untransmitted bytes so the pixels represented by the later can be reconstructed. The steering or control bits are repeated for subsequent omitted bytes unless it no longer indicates a match within a selected tolerance or threshold.

5 Claims, 3 Drawing Figures

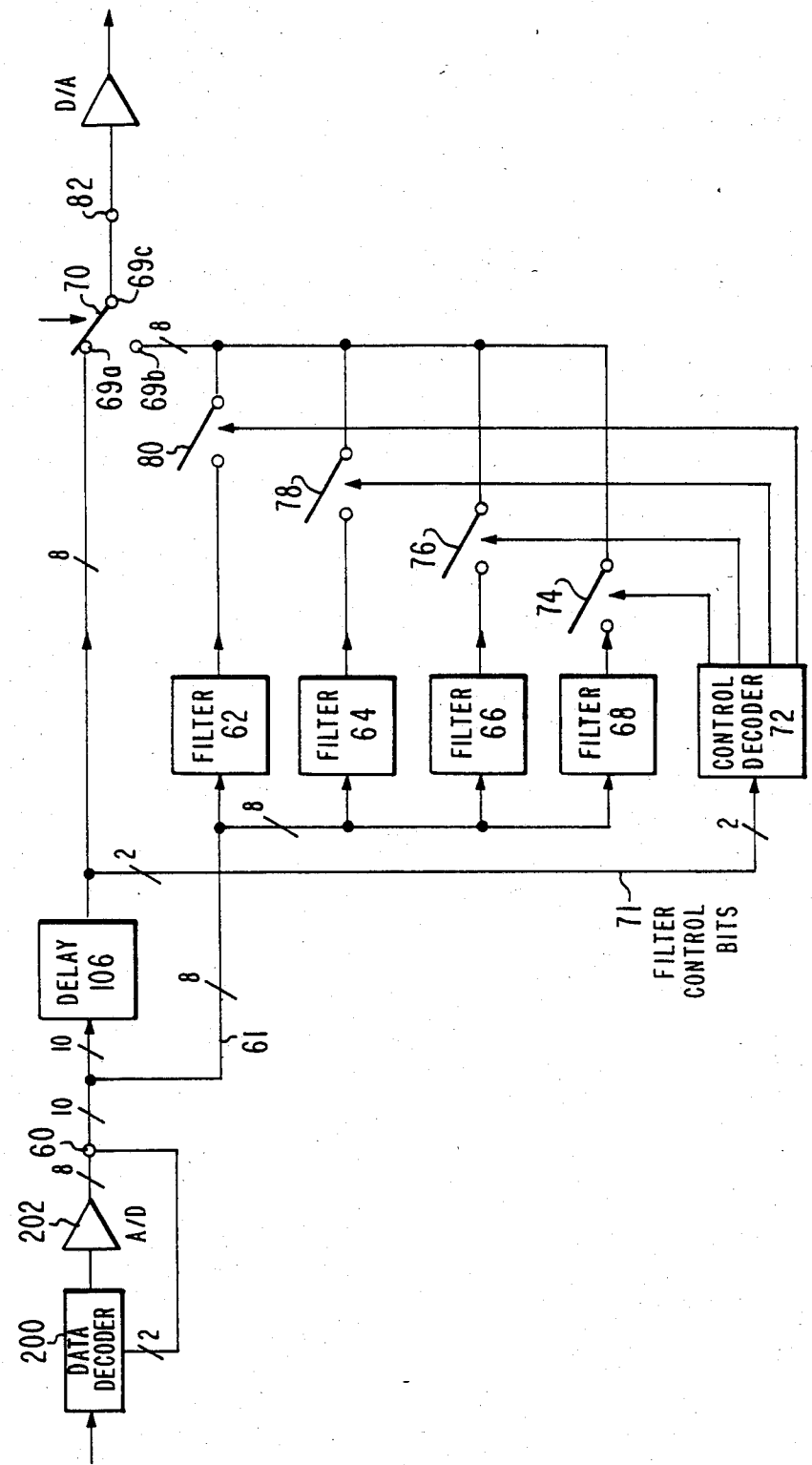

REDUCTION OF CONTROL BITS FOR ADAPTIVE SUB-NYQUIST ENCODER

BACKGROUND OF THE INVENTION

The introduction of new television services such as DBS (direct broadcasting satellite) offers the opportunity of introducing new television standards. It is desirable that any new standard provide a means for backward-compatible extended definition, i.e. viewing a high definition picture on a standard monitor. Most of the new systems being contemplated provide an auxiliary data channel as part of the video format. Therefore this disclosure provides a means for utilizing the auxiliary data channel for picture quality enhancement.

In U.S. Pat. No. 4,323,916 "Data Rate Reduction for Digital Video Signals by Subsampling and Adaptive Reconstruction" (R. A. Dischert and G. A. Reitmeier) a means was disclosed to enhance the resolution of a transmitted digital video signal by including "steering bits" in the data stream that indicate to a decoder which output of the outputs of several postfilters should be applied to reconstruct a deleted sample in the optimal way. The same concept can be applied to extending the resolution of an analog transmitted DBS signal by sampling it and computing intermediate samples in accordance with instructions in steering bits transmitted with the signal. In general, the data rate of the auxiliary channel is not high enough to support the number of bits required to control the filtering on a pixel-by-pixel basis.

In the previously mentioned patent, the encoder produces reconstruction filter control or steering bits according to which filter produces the "best" estimate, but the control bits may change to indicate a change in the reconstruction filter when the difference between the current "best" estimate and the previous "best" estimate may be as little as one quantization level and as a result, the control bits occur in a very random fashion, since they respond to noise and very small changes in picture content. This invention provides for modifications to the encoder of the aforementioned patent, that modifyies the generation of bits in order to greatly reduce the randomness of the filter control bits, which allows for a great amount of data reduction by further encoding the control bits.

SUMMARY OF THE INVENTION

A system that transmits a control byte to indicate which of combinations of surrounding bytes is a best match to an omitted byte. The control byte is repeated for subsequent omitted bytes unless it no longer indicates a match within a selected tolerance.

DESCRIPTION OF THE DRAWINGS

FIG. 3 is a receiver for use with FIGS. 1 and 2.

DETAILED DESCRIPTION

Figure 1:
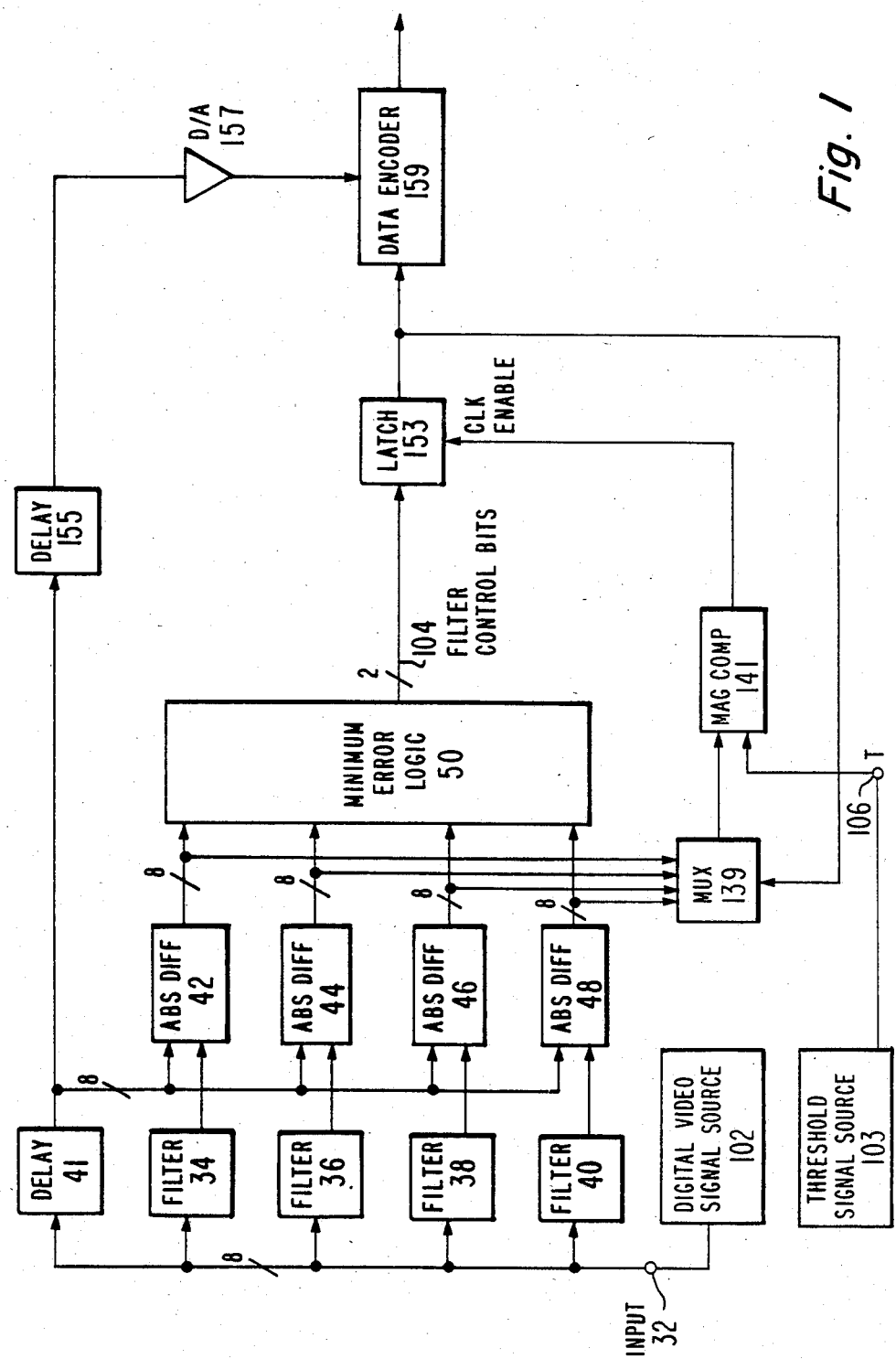
FIG. 1 is a block diagram of a first embodiment of a transmitter of the invention.

FIG. 1 shows a modified encoder wherein an 8-bit digital video signal supplied from a digital video signal source 102 is received at 8-bit terminal 32. As in the encoder of said patent, filters 34, 36, 38 and 40 (see FIGS. 6–9 of said patent) provide horizontal, vertical, left diagonal, and right diagonal averages or estimates of the sample output from equalizing delay 41. Absolute value difference circuits 42, 44, 46 and 48 provide a measure of the reconstruction error of each filter estimate, i.e. the difference between the actual value from delay 41 and the estimates from filters 34, 36, 38, and 40. Minimum error logic 50 (see FIG. 5 of said patent) examines said reconstruction errors and encodes which filter produces the best estimate, i.e. provides a code signal to indicate which estimate is the best match to the omitted digital word. Modifications to the basic encoder consist of MUX (multiplexer) 139 with inputs from the four absolute difference circuits 42–48, and an output controlled by the signal from 2-bit latch 153, which contains the control bits used for the previous deleted sample. The control bits from the output of latch 153 thus select in MUX 139 the difference between the last omitted digital word and its best estimate. The output signal from MUX 139 is fed to a magnitude comparator 141 along with a threshold T (generally a small number). The threshold number T may be provided by a suitable threshold signal source 103 coupled to input 106 of comparator 141. The output of magnitude comparator 141 is a 1 whenever the reconstruction error for the new omitted digital word exceeds the threshold T. When this occurs the reconstruction error of the filter indicated by the previous control bits is too large, and latch 153 is enabled so as to clock in new control bits generated by minimum error logic 50. If the reconstruction error indicated by the previous control bits is smaller than T, then latch 153 is disabled, and holds the previous control bits, despite the generation of a marginally "better" choice by minimum error logic 50. In other words, if the error is within a threshold, control bits from a previous omitted word are repeated instead of transmitting new control words. The output of latch 153 is now a set of control bits with great redundancy, which are fed to data encoder 159 to reduce this redundancy, and hence reduce the required data rate. Data encoder 159 may use any technique already in the art, although run length coding may be particularly appropriate in this case. It eliminates every other video data word from delay 41 and can also comprise a D/A (digital-to-analog) converter for the video bits.

Delay 155 is a field delay, for delaying by one field signal the samples provided by delay 41 for the purpose of allowing the encoded control bits to be inserted in the vertical interval preceding the field in which the samples selected by encoder 159 will be used. D/A converter 157 (optional) converts the samples into an analog signal if analog operation is desired. Data encoder 159 has sufficient buffering capacity to insert encoded filter control bits into the vertical interval of the transmitted signal. It should be understood that said encoded filter control bits need not be transmitted during the vertical interval if another means (e.g. a frequency multiplexed data carrier) is provided for their transmission. It should also be understood that threshold T may be modified by data encoder 159 in order to prevent the repetition of an overload condition in said encoder. Thus, the threshold may change as a function of the steering bit data rate.

Figure 2:
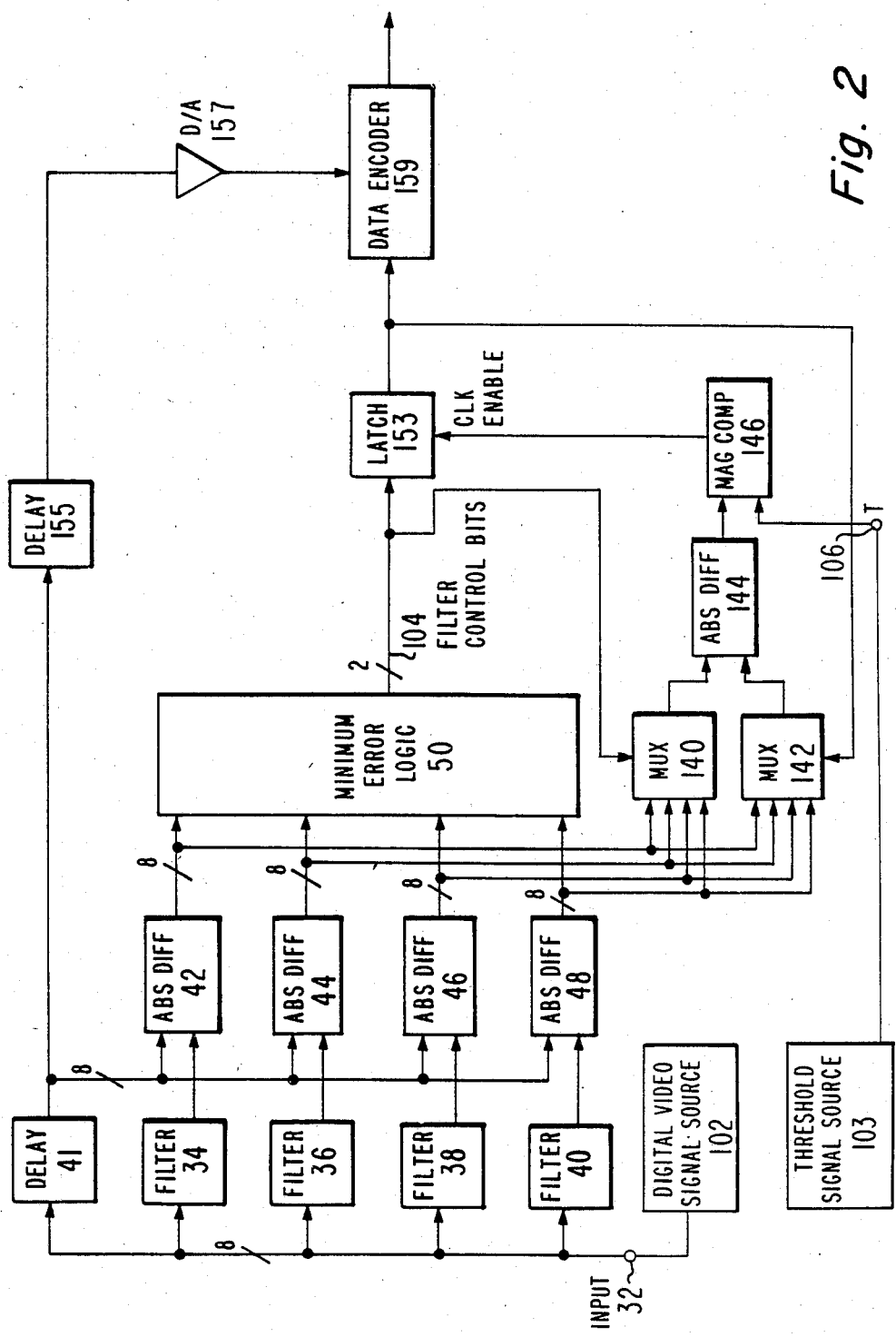
FIG. 2 is a block diagram of a second embodiment.

A modification to the encoder of said patent is shown in FIG. 2. The outputs of absolute difference circuits 42, 44, 46 and 48 are fed to multiplexers 140 and 142. MUX 140 is controlled by the output of minimum error logic 50, so that its output is the reconstruction error of the best estimate. MUX 142 is controlled by the output of latch 153, so that its output is the reconstruction error of the previously indicated filter. Both errors are applied to absolute difference circuit 144, whose output signal is the difference in reconstruction errors between the best estimate and the previously indicated estimate. This difference is fed to magnitude comparator 146 along with threshold T, and the output of said comparator enables the clocking of latch 153 as previously described. The remaining portions of FIG. 2 also function as described for FIG. 1.

FIG. 3 shows the decoder, which is essentially the same as the standard decoder of said patent. Data decoder 200 extracts the encoded control bits and decodes them, generating the same sequence as occurs at latch 153 in the 2+2 encoder. A/D 202 (optional) digitizes the transmitted video signal (consisting of the retained samples). The rest of the decoder is standard, and using the control bits, will reconstruct a signal with substantially greater resolution than the transmitted signal by use of the transmitted steering bits.

What is claimed is:

1. A method of transmitting data divided into first and second portions, each portion comprising a plurality of bytes, said method comprising transmitting said first portion, comparing at least one byte of the remaining untransmitted second portion to a plurality of selected combinations of bytes of said first portion, determining which of said selected combinations of bytes of said first portion is the closest match to said one byte of said second portion, transmitting control bits indicative of said closest match, and updating said control bits when said control bits no longer indicates a match within a selected tolerance.

2. A television signal transmission system comprising:
   signal source means for providing samples of a raster-scanned television signal;
   sample selection means coupled to said signal source means for coupling alternate selected signal samples to a transmission path;
   estimating means coupled to said sample selection means for generating a plurality of estimates of the value of each nonselected sample from the values of selected samples in the raster-spatial vicinity of each said nonselected samples;
   closest-estimate signal generating means coupled to said estimating means for generating signal identifying that estimate of said plurality of estimates which most closely approximates that nonselected sample of which it is an estimate;
   controllable storage means coupled to said closest-estimate signal generating means for storing said closest-estimate identifying signal in response to an update control signal supplied to a control input terminal thereof to form a stored closest-estimate identifying signal;
   threshold signal source means for providing a threshold control signal representative of a threshold value;
   comparison means having a first input means coupled to said storage means for receiving said stored closest estimate identifying signal, having a second input means coupled to said estimating means for receiving said estimates of values, and having a third input means coupled to said threshold signal source means for receiving said threshold control signal, said comparison means comparing said estimate currently indicated by the current said closest-estimate identifying signal with that estimate indicated by the currently stored closest-estimate identifying signal and for generating said update control signal when the difference therebetween exceeds said threshold value;
   coupling means coupled to said comparison means and to said control input terminal of said controllable storage means for coupling said update control signal to said controllable storage means for causing said controllable storage measn to store the current closest-estimate identifying signal when said threshold is exceeded;
   transmitting means coupled to said controllable storage means for transmitting said stored closest-estimate signal over said transmission path; and
   receiver means coupled to said transmission path for receiving said selected samples of said signal and said stored closest-estimate identifying signal for regenerating said nonselected samples.

3. In a television encoding system of the type comprising:
   a source for providing samples of a television signal;
   output means;
   sample selection means for selectively coupling alternate ones of said samples to said output means;
   a plurality of filters coupled to said source for providing estimate signals of the values of omitted ones of said samples;
   logic circuit means coupled to said plurality of filters for providing a filter identification signal indicative of the filter providing the closest estimate signal of said estimate signals of the omitted ones of said samples; and
   circuit means for coupling said filter identification signal to said output means for facilitating subsequent estimation and regeneration of said omitted ones of said samples from said alternate ones of said samples;
   the improvement, comprising
   memory means interposed in a path between said logic means and said output circuit means for providing temporary storage of said filter identification signal; and
   memory control means having input means coupled to receive said filter identification signal, said estimate signals and a threshold control signal and having an output coupled to control the storage of said filter identification signal in said memory means so as to minimize changes in the stored filter identification signal as a function of the magnitude of said threshold signal.

4. A television encoding system as recited in claim 3 wherein said memory control means comprises means for comparing said threshold signal with the output of the filter identified by the filter identification signal stored in said memory means for controlling said memory means.

5. A television encoding system as recited in claim 3 wherein said memory control means comprises means for comparing the current closest estimate signal identified by the filter identification signal output by said logic circuit means with the previous closest estimate signal indentified by the filter identification signal stored in said memory means to develop a difference signal and means for comparing said difference signal with said threshold signal for controlling storage of said filter identification signal in said memory means.

* * * * *